United States Patent
Varga et al.

(10) Patent No.: US 9,665,324 B2
(45) Date of Patent: *May 30, 2017

(54) SIMULATION OF PREPRINTED FORMS

(71) Applicant: Ricoh Company, Ltd., Tokyo (JP)

(72) Inventors: John Thomas Varga, Longmont, CO (US); Virgil-Alexandru Panek, Ghiroda (RO)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/704,419

(22) Filed: May 5, 2015

(65) Prior Publication Data
US 2015/0234625 A1    Aug. 20, 2015

Related U.S. Application Data

(63) Continuation of application No. 14/172,820, filed on Feb. 4, 2014, now Pat. No. 9,052,851.

(51) Int. Cl.
*H04N 1/40* (2006.01)
*G06F 3/12* (2006.01)
*G06K 15/02* (2006.01)
*H04N 1/60* (2006.01)

(52) U.S. Cl.
CPC .......... *G06F 3/1243* (2013.01); *G06F 3/1206* (2013.01); *G06F 3/1219* (2013.01); *G06F 3/1241* (2013.01); *G06K 15/1815* (2013.01); *G06K 15/1848* (2013.01); *G06K 15/1893* (2013.01); *H04N 1/6072* (2013.01)

(58) Field of Classification Search
USPC .............................. 358/3.28, 450, 540, 3.06
See application file for complete search history.

(56) References Cited

U.S. PATENT DOCUMENTS

| | | | | |
|---|---|---|---|---|
| 6,289,364 B1 * | 9/2001 | Borg | ....................... | G06T 11/00 345/629 |
| 6,579,324 B1 | 6/2003 | Lowry et al. | | |
| 6,880,906 B2 | 4/2005 | Barasch et al. | | |

(Continued)

FOREIGN PATENT DOCUMENTS

EP    1050852    11/2000

OTHER PUBLICATIONS

EP Search Report, EP15153569.7, 7 pages, Sep. 7, 2015.

*Primary Examiner* — Dung Tran
(74) *Attorney, Agent, or Firm* — Alpine Technology Law Group, LLC

(57) ABSTRACT

In one embodiment, a method for the simulation of preprinted forms is disclosed. The method includes receiving a first image as a back drop of a form, the image including a plurality of printable features corresponding to positions of the image. A second image is received as data to be filled in to the form, the second image including a second plurality of printable features corresponding to positions of the image, wherein the second plurality of printable features each have an assigned ink transparency. A feature of the first image is blended with a corresponding feature of the second image based on the assigned ink transparencies to form a blended feature. The blended features are combined to form a blended image that blends the first and the second images and is suitable for printing.

18 Claims, 5 Drawing Sheets

(56) References Cited

U.S. PATENT DOCUMENTS

| | | | |
|---|---|---|---|
| 7,209,258 B1* | 4/2007 | Markovic | G06T 11/203 |
| | | | 358/1.16 |
| 7,869,069 B2 | 1/2011 | Currans et al. | |
| 8,055,083 B2 | 11/2011 | Blanco | |
| 8,325,368 B2 | 12/2012 | Watanabe | |
| 8,783,856 B2 | 7/2014 | Matsunaga | |
| 2005/0134875 A1* | 6/2005 | Currans | H04N 1/3871 |
| | | | 358/1.9 |
| 2007/0019247 A1* | 1/2007 | Yoon | H04M 1/72547 |
| | | | 358/450 |
| 2008/0074439 A1* | 3/2008 | Parenteau | G06T 11/00 |
| | | | 345/630 |
| 2008/0304696 A1 | 12/2008 | Eschbach et al. | |
| 2008/0309980 A1 | 12/2008 | Iguchi | |
| 2009/0147019 A1 | 6/2009 | Yao | |
| 2011/0043535 A1 | 2/2011 | Kwiatkowski et al. | |
| 2011/0044535 A1* | 2/2011 | Stevens | H04N 1/3871 |
| | | | 382/162 |
| 2011/0235944 A1 | 9/2011 | Ernst et al. | |
| 2011/0289458 A1 | 11/2011 | Yu et al. | |

\* cited by examiner

SIMULATION OF PREPRINTED FORMS

The present patent application is a Continuation application claiming priority from application Ser. No. 14/172,820, filed Feb. 4, 2014, which is currently pending.

FIELD OF THE INVENTION

The invention relates to the field of image reproduction, and in particular, to combining data with preprinted forms.

BACKGROUND

Printers are common peripheral devices attached to computers. A printer allows a computer user to make a hard copy of documents that are created in a variety of applications and programs on a computer. To function properly, a channel of communication is established (e.g., via a network connection) between the printer and the computer to enable the printer to receive commands and information from the host computer. Once a connection is established between a computer and the printer, printing software is implemented at a print server to manage a print job through the complete printing process.

Often, print jobs are produced by printing data on a document that already has a preprinted form. The form may include text, graphics, gridlines, and images together with logos or branding. However, preprinted forms are expensive to create and handle. In particular, printer users struggle with the cost and logistics of specifying, purchasing, storing, moving and controlling large volumes of preprinted forms. Waste occurs when forms are modified and the remaining stock of the old version is eliminated.

The customer environment becomes more efficient and lower cost if preprinted forms are eliminated by substituting blank stock. The form part of the print job is represented as overlay data and the fill-in data for the form is overlaid on the form.

Accordingly, an approach to accurately represent and print document data against a background of form data is desired.

SUMMARY

In one embodiment, a method for the simulation of preprinted forms is disclosed. The method includes receiving a first image as a background of a form, the image including a plurality of printable features corresponding to positions of the image. A second image is received as data to be filled in to the form, the second image including a second plurality of printable features corresponding to positions of the image, wherein the second plurality of printable features each have an assigned ink transparency. A feature of the first image is blended with a corresponding feature of the second image based on the assigned ink transparencies to form a blended feature. The blended features are combined to form a blended image that blends the first and the second images and is suitable for printing.

BRIEF DESCRIPTION OF THE DRAWINGS

A better understanding of the present invention can be obtained from the following detailed description in conjunction with the following drawings, in which.

DETAILED DESCRIPTION

It is possible to represent a completed form using knockout. When the data overlaps the form, then the color of the simulated preprinted form is "knocked out" and replaced with a color from the document data. Knockout can be improved by simply excluding white and the color of the printing medium (e.g. paper) to be excluded from knockout. Even when some colors are excluded from knockout, the final combined form and document data may be rendered inaccurately on the printed paper. Knockout does not provide any mixing of overlapping colors.

Better results may be obtained by explicitly simulating overlaying light colors on a dark preprinted form. Better results are also obtained by blending overprinted values with the underlying simulated preprinted form color. For example, a blue semitransparent ink written over a yellow preprinted form results in a greenish color. A knockout approach however will present only the blue ink color. The greenish result is a more accurate duplication of the original result that would be achieved using a preprinted form. As described below these results may be obtained by hardware or an efficient software algorithm. There is no overhead on existing printing code to create transparent regions or create a metadata mapping on the user data as layer upon layer is added. As described below the user data typically uses overpaint blending rules which must be mixed in with transparency blending rules.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
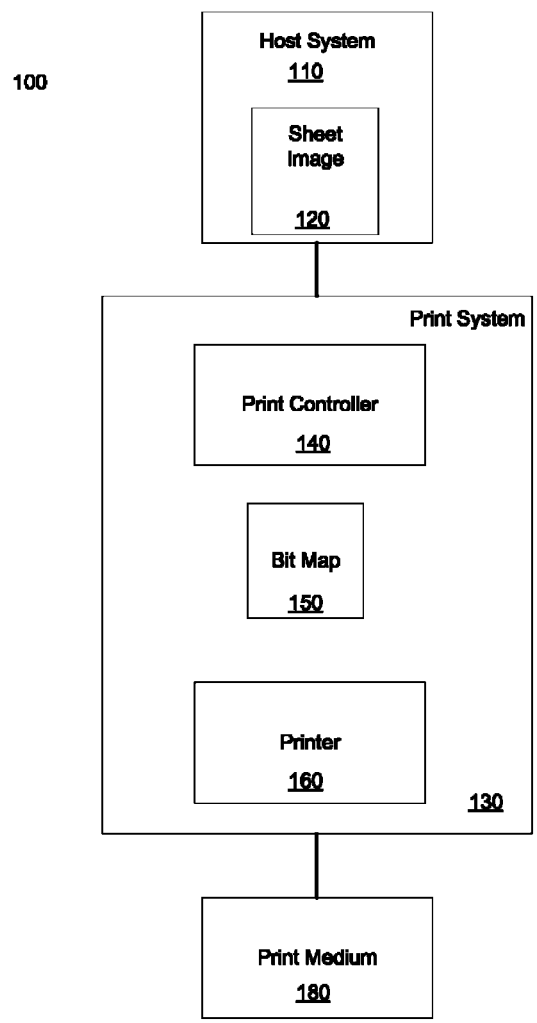
FIG. 1 illustrates one embodiment of a printing network.

FIG. 1 is a block diagram illustrating a printing network 100. Network 100 includes a host system 110 in communication with a printing system 130 to print a sheet image 120 onto a print medium 180 (e.g., paper) via a printer 160. The resulting print medium 180 may be printed in color and/or in any of a number of gray shades, including black and white.

The host system 110 may include any computing device, such as a personal computer, a server, or even a digital imaging device, such as a digital camera or a scanner. The sheet image 120 may be any file or data that describes how an image on a sheet of print medium should be printed. For example, the sheet image 120 may include PostScript data, Printer Command Language (PCL) data, and/or any other printer language data. The print controller 140 processes the sheet image to generate a bitmap 150 for printing to the print medium 180 via the printer 160.

The printing system 130 may be a high-speed printer operable to print relatively high volumes (e.g., greater than 100 pages per minute). The print medium 180 may be continuous form paper, cut sheet paper, and/or any other tangible medium suitable for printing. In one embodiment, the printing system 130 includes the printer 160 that presents the bitmap 150 onto the print medium 180 (e.g., via toner, ink, etc.) based on the sheet image 120.

Figure 2:
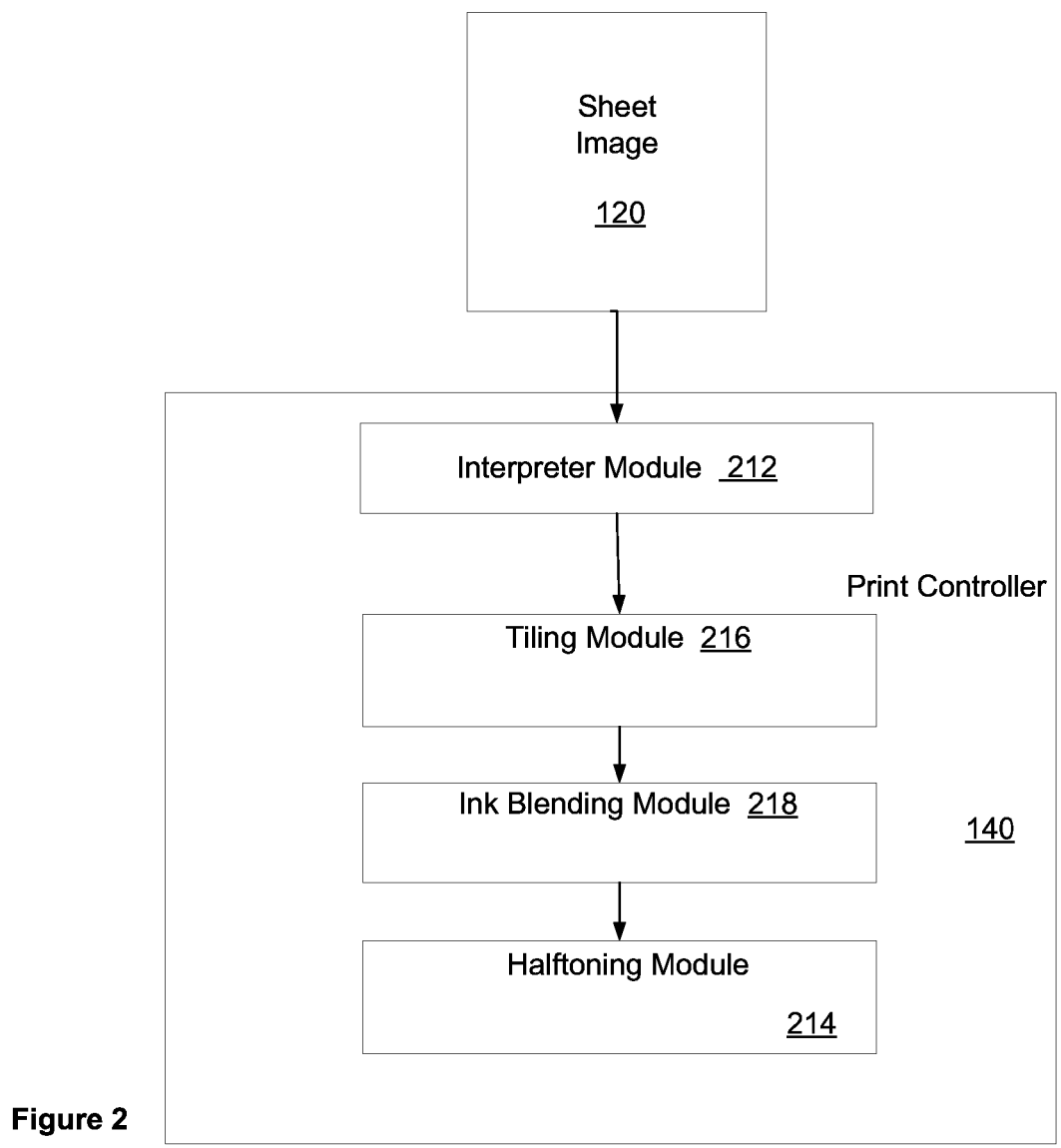
FIG. 2 illustrates one embodiment of a print controller.

The print controller 140 may be any system, device, software, circuitry and/or other suitable component operable to transform the sheet image 120 for generating the bitmap 150 in accordance with printing onto the print medium 180. FIG. 2 is a block diagram illustrating an exemplary print controller 140.

Referring to FIG. 2, the print controller 140, in its generalized form, includes an interpreter module 212 and a halftoning module 214. In one embodiment, these separate components represent hardware used to implement the print controller 140. Alternatively or additionally, the components may represent logical blocks implemented by executing software instructions in a processor of the printer controller 140. Accordingly, the invention is not intended to be limited to any particular implementation as such may be a matter of design choice.

The interpreter module 212 is operable to interpret, render, rasterize, or otherwise convert images (i.e., raw sheet-side images such as sheet image 120) of a print job into sheetside bitmaps. The sheetside bitmaps generated by the interpreter module 212 are each a two-dimensional array of pixels representing an image of the print job e.g., a continuous tone image (CTI), or contone image also referred to as full sheetside bitmaps.

The two-dimensional pixel arrays are considered "full" sheetside bitmaps because the bitmaps include the entire set of pixels for the image. The interpreter module 212 is operable to interpret or render multiple raw sheetsides concurrently so that the rate of rendering substantially matches the rate of imaging of production print engines.

The halftoning module 214 is operable to represent the sheetside bitmaps as patterns of ink drops or other dots, having one or more different drop or dot sizes. For example, the halftoning module 214 may convert the continuous tone sheetside bitmaps to a pattern of ink drops for application to the print medium 180 (e.g., paper). Once computed, the halftoning module 214 transfers the converted sheetside bitmaps to the print head controllers of the printer 160 to apply the ink drop(s) to the tangible medium 180. Instead of halftoning, other types of modules may be used to prepare the image for printing on other types of printers. The module may convert the image to a binary, multi-bit, single color or multi-tone image.

Before halftoning, the two images, the background from the preprinted form and the fill-in data to be printed over the form are combined. An optional tiling module 216 divides the bit maps of both images into tiles. This reduces the complexity of the combination. An ink blending module 218 combines the images for each tile based on the color value of both images and the transparency assigned to the two colors, as explained in more detail below. The tiles are combined together again in the tiling modules and then the halftoning module prepares the combined image for printing. If there is no tiling module, then the images are combined and halftoned as bitmaps.

As described below, the preprinted form's background data is blended into the page-specific fill-in data using a transparency setting for the fill-in-data (per plane) to simulate the opacity of inks or toners that might have been used to generate the fill-in data. First, the background of the preprinted form is simulated. Then the effect of printing the fill-in data over the background of the form is simulated. If, for example, the background of the form is a yellow background and some color is printed on top of it, then the results will vary. If transparent inks are used, then the resulting color will be different from the same ink color over black or white. The resulting color of the fill-in data on the print medium is affected by the form itself.

To accurately represent the effect, the properties of the ink being simulated can be accounted for. Different inks have different transparency properties. Some inks have almost no transparency and the color of the ink will not be affected by the backdrop. Other inks have high transparency so that e.g. yellow fill-in data over a blue background form region results in a green appearance.

In the case of a workflow that uses preprinted forms and fills them in using a particular kind of printer, the output will have a final finished look that depends on the papers and inks that are used. This workflow can be matched using electronic forms that are printed together with the filled in form data, by accurately characterizing the inks. To make the appearance of the electronically stored forms resemble that of the preprinted forms, the nature of the inks used in the print engine may be considered. A blending that simulates the printer inks can occur so that the results are about the same for both types of document production.

Figure 3:
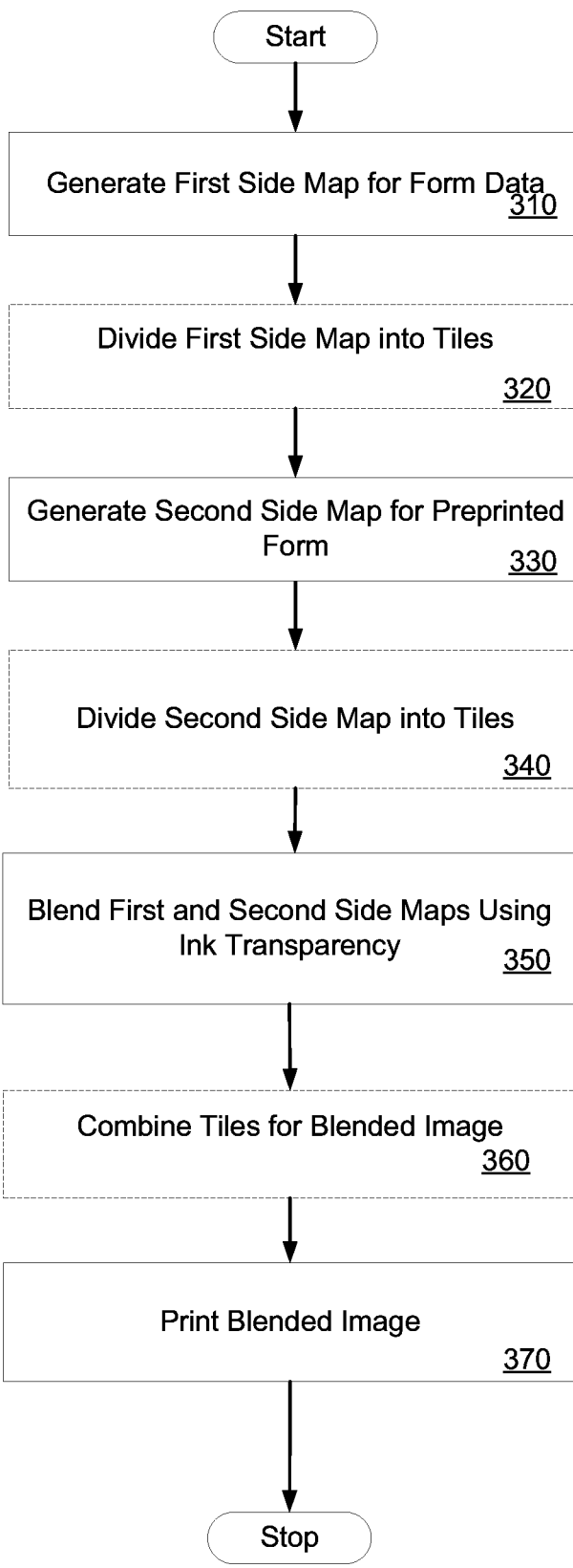
FIG. 3 illustrates one embodiment of a process flow diagram of combining colors of form data.

FIG. 3 is a process flow diagram of combining colors of page-specific fill-in data with colors of a simulated preprinted form. At 310 a first side map is generated based on the fill-in data that would be printed over a preprinted form. At 320 this side map is divided into tiles. At 330 a second side map is also created based on a representation of the preprinted form. At 340, this side map is divided into tiles. The tiling may be performed in any of a variety of ways, depending on the particular implementation.

The tile types are then mixed. This can be done in a variety of ways. One way to mix tile types is as follows:

Solids are blended with solids, rectangles, and text by adjusting colors;

Rectangles are blended with solids by adjusting colors;

Text is blended with solids by adjusting colors; and

Other combinations are rendered into the first side map.

These blending formulas all tend toward "darker" results in each plane. The color values can only increase based on the transparency of the simulated inks. A completely transparent ink does not increase the background color unless the foreground color value is greater than the background color value. A completely opaque ink does not decrease the background color. In the examples below, the inks are not treated as paints. With paint, an opaque color (such as white) may be able to completely cover a color underneath. Expressed as ink printing values, the values for the top color would completely remove the background values. If treated as paints, only a fully transparent ink would achieve an effect that is somewhat realistic, meaning the effect of printing over a preprinted form.

Considering the two side maps in more detail, two bitmaps are created at 310, and 330, one for the original page-specific fill-in data and one for the preprinted form. Using a transparency value describing the opacity or transparency of the printer inks or toner that are to be simulated, the preprinted form bitmap may be blended into the client data bitmap to add the preprinted background. In other words, the operations at 320 and 340 are optional.

Instead of the bitmap, tiles may be used. When tiles are used, the blending is performed in a similar way but each tile is blended as a whole rather than bit-wise. This may greatly reduce the number of blending operation calculations. The blending, whether bit-wise or with tiles, can be expressed mathematically. The blending operations can be performed in black and white or for color documents in any of a variety of different color planes. For CMYK printing, four color planes can be used, one for each of the four components CMYK. Alternatively, only two or three color planes can be used. The color planes are then combined for the final output. Similar operations may be used for other color types of color spaces, including hexachrome and DeviceN.

For the equations below X0 is the value of the color of a tile for the first side map corresponding to the background form data. X1 is the value of the color of the same tile for the second side map corresponding to the page-specific fill-in data. Xn is the value of the color that is to be printed. For 8-bit color systems, these values will range between 0 and 255, but the values in these equations is normalized between 0.0 and 1.0. Mi is the transparency or opacity of the fill-in data. The Mi values in the example below are between 0.0 for opaque and 1.0 for transparent, but the approach may be modified to suit different numerical scales for Mi.

For normal blending, the new color value per color plane, where n represents one of e.g. four color planes, CMYK, is given as follows:

$$Xn=1-((1-X0)*(1-X1)), \text{ where the ink opacity is ignored}$$

For a preprinted form simulation, let X0 be the final colorant (of the overlay in the bitmap) and X1 be the color value of the data filled in to the form. Let Xmax=1.0, then for ink opacity Mi (for the given colorant), the following relations may be used:

$$\text{For } Mi=1 \text{ (transparent ink)}, Xn=\max(X0,X1)$$

$$\text{For } Mi=0 \text{ (opaque ink)}, Xn=\min(X\max,X0+X1)$$

$$\text{For } 0<Mi<1 \text{ (real ink)}, Xn=\min(X\max,\max(X0,X1)+(1-Mi)*\min(X0,X1))$$

As described above, the different colors are blended based on transparency values for the inks that are being simulated. These values are adapted for the inks that will be used to print the blended final document. The transparency setting blends in the final color values and transparency with the background's color values. The fill-in data's transparency is adjusted by a percentage that describes the transparency or opacity of the toner or ink being simulated for the data. By adjusting the transparency values, different print technologies can be simulated.

After the color value for each tile is determined. The tiles are combined at 360 to form a final combined image. The image combines the colors for each tile and simulates printing the fill-in data over a preprinted form. The combined image may then be printed at 370.

Figure 4:
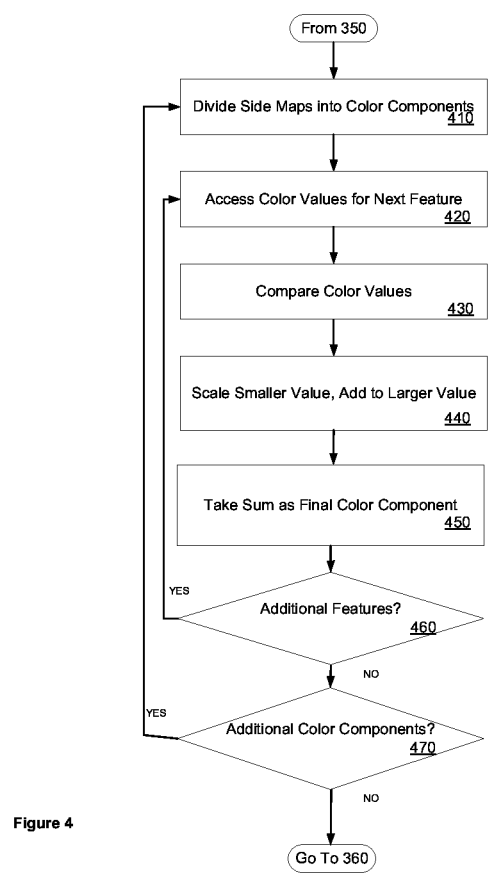
FIG. 4 illustrates one embodiment of a process flow diagram of combining inks.

The combination of inks at 350 is shown in more detail in the process flow diagram of FIG. 4. At 410 the two side maps are each divided into separate component images for each color plane. For a CMYK color plane, there will be a C image, an M image, a Y image, and a K image for both side maps. The blending starts for the first color component, for example, the C component. As described herein the color values for each of the four color planes are blended, however, the invention is not so limited. In order to reduce computational complexity blending may be done for only some of the color planes. Since the eye is more sensitive to variations in Cyan and Yellow, these two colors may be blended and not Magenta and Black. Alternatively only Cyan is blended. For the other colors, e.g. magenta and black, a simpler addition of the two values or a knockout approach may be used.

At 420, the value for first color component of the first printable feature of the first image and the value of the first color component of the corresponding printable feature of the second image are accessed. At 430, the color components, also referred to as the saturation components, are compared. At 440, the smaller of the two color components is scaled and added to the full value of the larger of the two color components. At 450, the sum of the two values is taken as the color component value for the output image. As mentioned above, the final color component may be limited to some maximum value. For a saturation scale from 0 to 1, the maximum value is 1. If the sum is greater than 1, then the final value for the color component of the printable feature will be 1.

This process is repeated at 460 for each printable feature and at 470 for each color component. The sums at 450 may be combined into tiles or combined to form bitmaps. The tiles may be combined at 460 using any of a variety of different approaches. Adjustment may be made to the color values as the tiles are recombined depending on the particular implementation.

Ink transparency may be determined in any of a variety of different ways. Different measurement systems may be used for different ink and printer types. For best results each colorant (cyan, magenta, yellow, and black) will each have its own Mi value determined using the real inks. This can be measured for a particular ink formula and printer combination and then the values may be used by the print controller as described in the context of FIG. 3.

In one example, to measure ink transparency, the ink is printed onto a colorfast surface that will not change when it becomes wet with an applied ink, as in a real preprinted form. For example, the form can have 25% density in C, M, Y, and K. Printing various levels of cyan on both the cyan part of the form and the white part should allow a basic densitometer to measure the resultant densities and calculate the ink opacity by using the measured results and solving the equations for Mi.

For example, using a 25% background (X0) and 70% foreground (X1) of one of the colorants, and measuring the combination (Xn) at 80%, provides:

$$Mi=(X1+X0-Xn)/X0=0.6$$

The non-linear nature of the equations as the densities get higher makes Mi approach 1.0, (for example, when X1 and Xn=1.0, Mi becomes X0/X0, or 1.0 for all backgrounds). The equations become very non-linear if the calculations require using Xmax (1.0), for example. For lower values, (for example, with X1 about the same as X0 and where Xn measures about 2X1), we get Mi closer to 0. It will usually be true from the measurements that Xn will be less than the value of X1+X0 while also greater than either X1 or X0 individually, so the numerator should be positive. Also, as X0 approaches 0, X1 should be almost the same as Xn, but it is difficult to find a factor mathematically using X0=0.

The equation above may be applied to each colorant (i.e. each ink color) in the same manner. Alternatively, the equation may be applied only to the more important colors, such as cyan first, then magenta.

In the test chart printing described above, uncombined colorants are printed so that the form's colorants are unaltered. This is to allow the system to be calibrated for a particular type of ink. However, the nature of the ink may not allow a consistent measurement of opacity given all preprinted densities mixed with all overlaying densities. In this case, approximations may be used for the most important parts of the document. As an example, a form designed to have a light background (like a bank check) overlaid with a darker ink can be used to explicitly measure the desired mixing. In other words, a portion of a document in which the text is printed over the background can be printed as a test sample. Ink systems are not very linear so other areas won't look the same on such a simulation if the same parameters are used, but this does permit the critical portion to be effectively simulated.

While the above formulas may be used to directly calculate an appropriate amount for each ink colorant. A table look up may be more accurate and faster in a real system. Color mixing tables may be used look up resultant values from a sparse table of colorant fill-in and background feature mixtures. Intermediate values may be interpolated. Interpolation techniques established for color management profiles may be used to provide more accuracy if desired. A set of 4 one-dimensional tables one for each colorant can be created to create a mixing curve. Points in between points on the table may be determined by linear interpolation. A four-dimensional mixing table that includes all colorants together will allow simulation of colorant interactions for even more accuracy. The calculation and determination of ink levels and the degree of accuracy may be adapted to suit different implementations including print speed demands and available processing resources.

The density of many inks is affected by the thickness of the ink layer. Thicker ink is less transparent. At the maximum thickness for a particular printer, the densitometer reading may be greater than 1.0. Any ink transparency value or ink combination table may consider printed ink thickness and base the values on an average thickness at which the printer typically operates.

As mentioned above, the sheet side images may be broken into tiles to make calculations simpler and to reduce the demands on memory for blending images. Smaller tiles require less memory to process and can later be recombined to generate the complete sheet side image. The tiles may be made still more efficient by using meta-data structures to represent the content of corresponding portions of a bitmap memory. The metadata structures represent the bitmap in a compact form without requiring writing of the pixels of a data object to the bitmap memory.

A compressed bitmap may then be generated from the meta-data structures. Data is read from the bitmap only where the meta-data cannot compactly represent the content of the corresponding portion of the bitmap memory.

The tiling may be done in a variety of different ways. In some embodiments, a compressed bitmap representation of a sheet side image is generated with a meta-data structure for each of a number of portions of the bitmap meta data. The portion can be defined by bounding boxes of a particular size. The metadata stores information about data object in the bitmap such as rectangle, transparency masks, palettes, images, etc.

Data objects in the bitmap are identified and the corresponding meta-data structure is updated for any corresponding portions of the bitmap that would be affected if data derived from the data object were to be written in the bitmap memory. A corresponding data field type in each meta-data structure is also updated. A bitmap representation of the sheet side image may then be compressed by excluding the data objects that are contained in the meta data structure.

The blending operations may be performed on the data objects for the two sheet side images. The data objects may then be combined and the new sheet side image built using the combined metadata.

Figure 5:
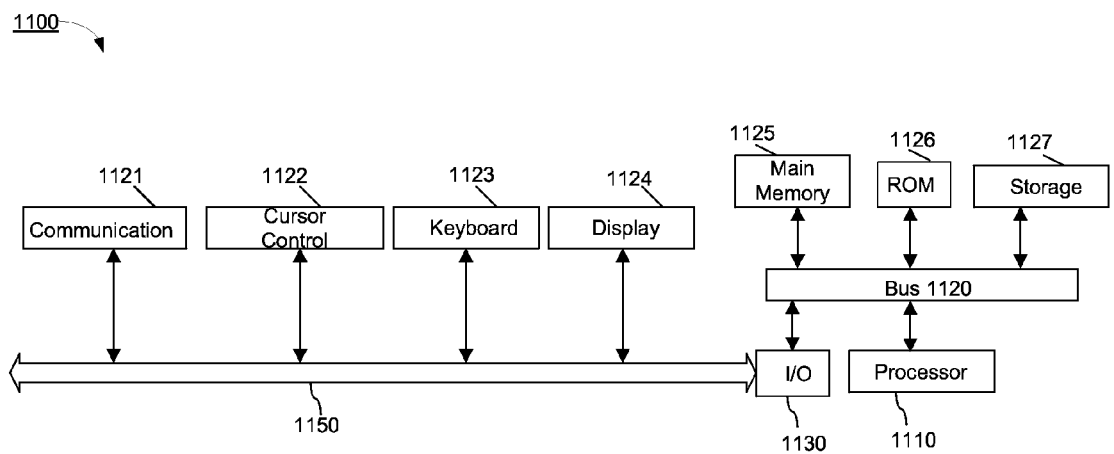
FIG. 5 illustrates one embodiment of a computer system.

FIG. 5 illustrates a computer system 1100 on which print controller 140 and/or host system 110 may be implemented. Computer system 1100 includes a system bus 1120 for communicating information, and a processor 1110 coupled to bus 1120 for processing information.

Computer system 1100 further comprises a random access memory (RAM) or other dynamic storage device 1125 (referred to herein as main memory), coupled to bus 1120 for storing information and instructions to be executed by processor 1110. Main memory 1125 also may be used for storing temporary variables or other intermediate information during execution of instructions by processor 1110. Computer system 1100 also may include a read only memory (ROM) and or other static storage device 1126 coupled to bus 1120 for storing static information and instructions used by processor 1110.

A data storage device 1127 such as a magnetic disk or optical disc and its corresponding drive may also be coupled to computer system 1100 for storing information and instructions. Computer system 1000 can also be coupled to a second I/O bus 1150 via an I/O interface 1130. A plurality of I/O devices may be coupled to I/O bus 1150, including a display device 1124, an input device (e.g., an alphanumeric input device 1123 and or a cursor control device 1122). The communication device 1121 is for accessing other computers (servers or clients). The communication device 1121 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A printing system that combines features of a first bitmap image and features of a second bitmap image, the printing system comprising:
   a print engine; and
   a print controller operable for:
   receiving the first bitmap image to represent a pre-printed form, the bitmap image including a plurality of printable features corresponding to positions of the bitmap image;

receiving the second bitmap image as page-specific fill-in data to be filled in to the form, the second bitmap image including a second plurality of printable features corresponding to positions of the bitmap image, wherein the second plurality of printable features each have an assigned transparency value describing an ink transparency;

blending a feature of the first bitmap image with a corresponding feature of the second bitmap image based on the assigned transparency values to form a blended feature, wherein blending comprises adding a color value scaled based on the assigned ink transparency for the printable feature for a black color plane and adding color values independently of ink transparency for any other color planes of the first image and the second image; and combining the blended feature to form a blended image that blends the first and the second bitmap images and is suitable for printing.

2. The printing system of claim 1, wherein blending comprises adding a color value of a feature of the first bitmap image with a color value of the corresponding feature of the second image, wherein the color value of the feature of one of the first and second bitmap images is scaled based on the assigned transparency values.

3. The printing system of claim 2, wherein the scaled color value is the color value having the lowest value as between the color value of the printable feature of one of the first bitmap image and the printable feature of the second bitmap image.

4. The printing system of claim 2, the print controller further operable for adding a color value for the printable feature independently for each color plane of the first bitmap image and the second bitmap image.

5. The printing system of claim 4, the print controller further operable for combining the color values for each color plane to obtain blended features.

6. The printing system of claim 1, wherein the plurality of printable features comprise picture elements of a bitmap.

7. The printing system of claim 1, wherein the print controller further operable for dividing the first and second bitmap images into tiles, the tiles corresponding to areas of the bitmap images and wherein the printable features comprise the tiles.

8. The printing system of claim 7, wherein combining the blended features comprises combining the tiles.

9. The printing system of claim 1, wherein corresponding first and second printable features have a color and wherein blending comprises:

factoring the color of the corresponding second printable feature by the corresponding ink transparency; and combining the factored color and the color of the first printable feature to obtain a final color for the blended image.

10. The printing system of claim 9, wherein the colors of the first and second printable features have components in multiple color planes, the print controller further operable for performing factoring and combining for each color plane.

11. The printing system of claim 10, wherein factoring further comprises factoring the color of the first printable feature and the color of the second printable feature by the ink transparency.

12. A non-transitory computer-readable medium tangibly embodying programmed instructions which, when executed by a computer system, are operable to execute a method of combining features of a bitmap first image and features of a second bitmap image, the method comprising:

receiving the first bitmap image to represent a pre-printed form, the bitmap image including a plurality of printable features corresponding to positions of the bitmap image;

receiving the second bitmap image as page-specific fill-in data to be filled in to the form, the second bitmap image including a second plurality of printable features corresponding to positions of the bitmap image, wherein the second plurality of printable features each have an assigned transparency value describing an ink transparency;

blending a feature of the first bitmap image with a corresponding feature of the second bitmap image based on the assigned transparency values to form a blended feature, wherein blending comprises adding a color value scaled based on the assigned ink transparency for the printable feature for a black color plane and adding color values independently of ink transparency for any other color planes of the first image and the second image; and combining the blended feature to form a blended image that blends the first and the second bitmap images and is suitable for printing.

13. The computer-readable medium of claim 12, wherein blending comprises adding a color value of a feature of the first bitmap image with a color value of the corresponding feature of the second bitmap image, wherein the color value of the feature of one of the first and second bitmap images is scaled based on the assigned transparency values.

14. The computer-readable medium of claim 13, wherein the scaled color value is the color value having the lowest value as between the color value of the printable feature of one of the first bitmap image and the printable feature of the second bitmap image.

15. The computer-readable of claim 13, wherein the method further comprising dividing the first and second image into tiles, the tiles corresponding to areas of the images and wherein the printable features comprise the tiles.

16. A method of combining features of a first bitmap image and features of a bitmap second image, the method comprising:

a print controller receiving the first bitmap image to represent a pre-printed form, the bitmap image including a plurality of printable features corresponding to positions of the bitmap image;

the print controller receiving the second bitmap image as page-specific fill-in data to be filled in to the form, the second bitmap image including a second plurality of printable features corresponding to positions of the bitmap image, wherein the second plurality of printable features each have an assigned transparency value describing an ink transparency;

the print controller blending a feature of the first bitmap image with a corresponding feature of the second bitmap image based on the assigned transparency values to form a blended feature, wherein blending comprises adding a color value scaled based on the assigned ink transparency for the printable feature for a black color plane and adding color values independently of ink transparency for any other color planes of the first image and the second image; and the print controller combining the blended feature to form a blended image that blends the first and the second bitmap images and is suitable for printing.

17. The method of claim 16, wherein blending comprises adding a color value of a feature of the first image with a color value of the corresponding feature of the second bitmap image, wherein the color value of the feature of one of the first and second bitmap images is scaled based on the assigned transparency values.

18. The method of claim 16, wherein corresponding first and second printable features have a color and wherein blending comprises:
   factoring the color of the corresponding second printable feature by the corresponding ink transparency; and
   combining the factored colors to obtain a final color for the blended image.

\* \* \* \* \*

UNITED STATES PATENT AND TRADEMARK OFFICE
CERTIFICATE OF CORRECTION

PATENT NO. : 9,665,324 B2  Page 1 of 1
APPLICATION NO. : 14/704419
DATED : May 30, 2017
INVENTOR(S) : Varga et al.

It is certified that error appears in the above-identified patent and that said Letters Patent is hereby corrected as shown below:

In the Specification

In Column 3, Line 45, delete "," after before halftoning

In Column 4, Line 7, Insert -- (e.g. yellow) -- after high transparency and delete "e.g. yellow" after so that In Column 5, Line 10, delete "is" and insert -- are -- after in these equations Signed and Sealed this
Nineteenth Day of September, 2017

Joseph Matal
*Performing the Functions and Duties of the
Under Secretary of Commerce for Intellectual Property and
Director of the United States Patent and Trademark Office*